US012718310B2

(12) United States Patent
Stockert et al.

(10) Patent No.: US 12,718,310 B2
(45) Date of Patent: Aug. 25, 2026

(54) SYSTEM AND METHOD FOR PROVIDING ASSISTANCE DURING HIGH-IMPACT EVENTS

(71) Applicants: AT&T Intellectual Property I, L.P., Atlanta, GA (US); AT&T Mobility II LLC, Atlanta, GA (US)

(72) Inventors: Mark Stockert, San Antonio, TX (US); Thomas J. Routt, Sequim, WA (US); Jerry Robinson, Middletown, NJ (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 18/975,092

(22) Filed: Dec. 10, 2024

(65) Prior Publication Data

US 2026/0162202 A1 Jun. 11, 2026

(51) Int. Cl.
*G06Q 50/26* (2024.01)
*G06F 16/903* (2019.01)
(Continued)

(52) U.S. Cl.
CPC ....... *G06Q 50/26* (2013.01); *G06F 16/90335* (2019.01); *G06F 16/9035* (2019.01); *G06F 16/909* (2019.01)

(58) Field of Classification Search
CPC ........ G06Q 50/26; G06Q 40/08; G06Q 50/40; G06F 16/909; G06F 16/90335;
(Continued)

(56) References Cited

U.S. PATENT DOCUMENTS 5,146,502 A 9/1992 Davis
5,539,806 A 7/1996 Allen et al.
(Continued)

FOREIGN PATENT DOCUMENTS

JP 2004248022 A 9/2004

OTHER PUBLICATIONS

Charlton, N. , et al., "User requirements for the session initiation protocol (SIP) in support of deaf, hard of hearing and speech-impaired individuals", http://tools.ietf.org/html/rfc3351, 2002.
(Continued)

*Primary Examiner* — Vincent M Cao
(74) *Attorney, Agent, or Firm* — GUNTIN & GUST, PLC; Daniel Williams

(57) ABSTRACT

Aspects of the subject disclosure may include, for example, a device, including: a processing system including a processor; and a memory that stores executable instructions that, when executed by the processing system, facilitate performance of operations by a suite of artificial intelligence (AI) assistants, the operations including: creating a quantum digital twinning model for a first high-impact event; gathering real-time dynamic data associated with the first high-impact event; generating prompts for a generative AI trained for high-impact events based on the quantum digital twinning model and the real-time dynamic data; and receiving and providing recommendations for actions addressing issues related to the first high-impact event to a user of the device. Other embodiments are disclosed.

20 Claims, 10 Drawing Sheets

(51) Int. Cl.
*G06F 16/9035* (2019.01)
*G06F 16/909* (2019.01)

(58) Field of Classification Search
CPC ........ G06F 16/9035; G08G 1/16; G08G 5/80; B60Q 1/525; B60W 30/08; B60W 30/0956; B60W 60/0015
See application file for complete search history.

(56) References Cited

U.S. PATENT DOCUMENTS 5,737,389 A 4/1998 Allen
5,809,112 A 9/1998 Ryan
5,956,668 A 9/1999 Alshawi et al.
5,982,853 A 11/1999 Liebermann
6,061,431 A 5/2000 Knappe et al.
6,212,496 B1 4/2001 Campbell et al.
6,477,239 B1 11/2002 Ohki et al.
6,546,082 B1 4/2003 Alcendor et al.
6,724,862 B1 4/2004 Shaffer et al.
6,813,490 B1 11/2004 Lang et al.
7,225,224 B2 5/2007 Nakamura
7,277,858 B1 10/2007 Weaver et al.
7,315,612 B2 1/2008 Mcclelland
7,333,507 B2 2/2008 Bravin et al.
7,451,292 B2 11/2008 Routt
7,529,545 B2 5/2009 Rader et al.
7,970,115 B1 6/2011 Warta et al.
8,190,553 B2 5/2012 Routt
8,280,434 B2 10/2012 Garg
8,325,883 B2 12/2012 Schultz et al.
8,494,507 B1 7/2013 Tedesco et al.
8,566,075 B1 10/2013 Bruner et al.
9,065,561 B2 6/2015 Imran
9,549,060 B2 1/2017 Stockert et al.
10,142,459 B2 11/2018 Wohlert et al.
10,244,581 B2 3/2019 Routt
10,929,928 B2 * 2/2021 Bayley .................. G06Q 40/04
10,965,777 B2 3/2021 Stockert et al.
11,108,617 B2 8/2021 Stockert et al.
11,366,897 B1 6/2022 Ramanathan et al.
11,942,194 B2 * 3/2024 Shriberg ................ G16H 10/60
12,333,622 B1 * 6/2025 Dhakshanamoorthy .................... G06Q 50/265
2002/0103622 A1 * 8/2002 Burge .................... G16Z 99/00 702/183
2002/0112066 A1 8/2002 Agraharam et al.
2004/0081312 A1 4/2004 Salpietra
2005/0042581 A1 2/2005 Oh et al.
2006/0174315 A1 8/2006 Kim et al.
2008/0008328 A1 1/2008 Hansson et al.
2008/0243513 A1 10/2008 Bucchieri et al.
2009/0319180 A1 12/2009 Robinson et al.
2010/0100388 A1 4/2010 Kehoe
2010/0222098 A1 9/2010 Garg et al.
2012/0017262 A1 1/2012 Kapoor et al.
2012/0042360 A1 2/2012 Bakeir et al.
2013/0066609 A1 3/2013 Gilkes
2013/0079061 A1 3/2013 Jadhav et al.
2014/0314261 A1 10/2014 Selig et al.
2015/0379170 A1 * 12/2015 Beloglazov ............ G06Q 10/10 703/6
2017/0078478 A1 3/2017 Wohlert et al.
2017/0116883 A1 4/2017 Wohlert et al.
2019/0313230 A1 * 10/2019 MacGabann .......... G16H 40/67
2020/0273582 A1 * 8/2020 Ben Gad ................ G16H 50/20
2020/0334928 A1 * 10/2020 Bourke .................... G06N 5/04
2020/0402192 A1 12/2020 Dahm et al.
2021/0157662 A1 5/2021 Heckey et al.
2021/0312047 A1 10/2021 Chen
2023/0007451 A1 1/2023 Stone et al.
2023/0058169 A1 * 2/2023 Cella ........................ G06N 3/08
2023/0112482 A1 4/2023 Stockert et al.
2023/0229950 A1 * 7/2023 Selly ...................... G16B 35/20
2023/0308458 A1 9/2023 Varsanyi et al.
2023/0353982 A1 11/2023 Routt et al.
2023/0376815 A1 * 11/2023 Yuan ...................... G06N 10/20
2023/0412626 A1 12/2023 Wright
2024/0031224 A1 1/2024 Stockert et al.
2024/0039945 A1 2/2024 Agrawal et al.
2024/0046565 A1 2/2024 Wernau et al.
2024/0064001 A1 2/2024 Winstrom
2024/0078457 A1 3/2024 Stockert et al.
2024/0119550 A1 4/2024 Stockert et al.
2024/0305663 A1 9/2024 Routt et al.

OTHER PUBLICATIONS

Dubrova , et al., “Breaking a Fifth-Order Masked Implementation of CRYSTALS-Kyber by Copy-Paste”, Royal Institute of Technology, Stockholm, Sweden, 2022, 22.

Grover, Lov K., “Quantum Mechanics helps in searching for a needle in a haystack”, Physical Review Letters, 79 (2), 325 (1997)., 1997, 4 pgs.

Shor, Peter , “Polynomial-Time Algorithms for Prime Factorization and Discrete Logarithms on a Quantum Computer”, https://epubs.siam.org/doi/10.1137/S0097539795293172, 1997, 30 pgs.

* cited by examiner

CONTENT SOURCES 175
144
144
MEDIA TERMINAL 142
MEDIA ACCESS 140
NE 156
NE 150
COMMUNICATIONS NETWORK 125
NE 154
NE 152
WIRELESS ACCESS 120
122
126
124
124
BROADBAND ACCESS 110
114
ACCESS TERMINAL 112
114
VOICE ACCESS 130
SWITCHING DEVICE 132
134
134
100

CLOUD COMPUTING ENVIRONMENTS 375
VIRTUALIZED NETWORK FUNCTION CLOUD 325
VNE 330
VNE 332
VNE 334
300

TRANSPORT LAYER 350
BROADBAND ACCESS 110
VOICE ACCESS 130
WIRELESS ACCESS 120
MEDIA ACCESS 140
CONTENT SOURCES 175

600

SYSTEM AND METHOD FOR PROVIDING ASSISTANCE DURING HIGH-IMPACT EVENTS

FIELD OF THE DISCLOSURE

The subject disclosure relates to a system and method for providing assistance during high-impact events.

BACKGROUND

High-impact, wide-area events such as pandemics, structural failures, wildfires, floods, and hurricanes can have devastating effects on neighborhoods, communities and infrastructure. These events create an urgent need for timely responses and resources from first responders. However, first responders and disaster response teams can be overwhelmed by these events for several reasons.

Complex, high-impact events can cause transportation difficulties and limit access to affected areas, making it harder for first responders to reach those in need. A surge in assistance requests can quickly overwhelm first responders, such that responding promptly or prioritizing the most urgent needs becomes challenging. The demand for medical supplies, equipment, and personnel often exceeds availability during high-impact events, leading to resource shortages. Ineffective or damaged communication systems, whether directly caused by the event or not, can hinder coordination efforts, resulting in inefficiencies and delays. Further, first responders may face physical exhaustion due to long hours, hazardous conditions, and the physically demanding nature of their work.

Additionally, exposure to traumatic events can lead to emotional trauma for first responders, affecting their ability to perform their duties effectively.

BRIEF DESCRIPTION OF THE DRAWINGS

Reference will now be made to the accompanying drawings, which are not necessarily drawn to scale, and wherein:

FIG. 2B is a block diagram illustrating an example, non-limiting embodiment of a quantum vector database schema for disaster recovery used in a system for providing assistance to first responders during high-impact events functioning within the communication network of FIG. 1 in accordance with various aspects described herein.

DETAILED DESCRIPTION

The subject disclosure describes, among other things, illustrative embodiments for system and method for providing guidance and recommendations to first responders during high-impact events. Other embodiments are described in the subject disclosure.

One or more aspects of the subject disclosure include a device, including: a processing system including a processor; and a memory that stores executable instructions that, when executed by the processing system, facilitate performance of operations by a suite of artificial intelligence (AI) assistants, the operations including: creating a quantum digital twinning model for a first high-impact event; gathering real-time dynamic data associated with the first high-impact event; generating prompts for a generative AI trained for high-impact events based on the quantum digital twinning model and the real-time dynamic data; and receiving and providing recommendations for actions addressing issues related to the first high-impact event to a user of the device.

One or more aspects of the subject disclosure include a non-transitory machine-readable medium, storing executable instructions that, when executed by a processing system including a processor, facilitate performance of operations of: implementing a suite of artificial intelligence (AI) assistants; gathering real-time dynamic data associated with a first high-impact event; the suite of AI assistants generating prompts for a generative AI trained for high-impact events based on the real-time dynamic data; receiving a recommendation of actions addressing issues related to the first high-impact event from the generative AI; repeating the generating and receiving steps until the recommendation received from the generative AI is refined; and the suite of AI assistants providing the recommendation to a user.

One or more aspects of the subject disclosure include a method of: effectuating, by a processing system including a processor, a suite of artificial intelligence (AI) assistants; collecting, by the processing system, real-time dynamic data associated with a first high-impact event; generating, by the suite of AI assistants, prompts provided to a generative AI trained for high-impact events, wherein the prompts are based on the real-time dynamic data; receiving, the suite of AI assistants, a recommendation of actions addressing issues related to the first high-impact event from the generative AI; repeating, the suite of AI assistants, the generating and receiving steps until the recommendation received from the generative AI is refined; and providing, by the suite of AI assistants, the recommendation to a user of the suite of AI assistants.

Figure 1:
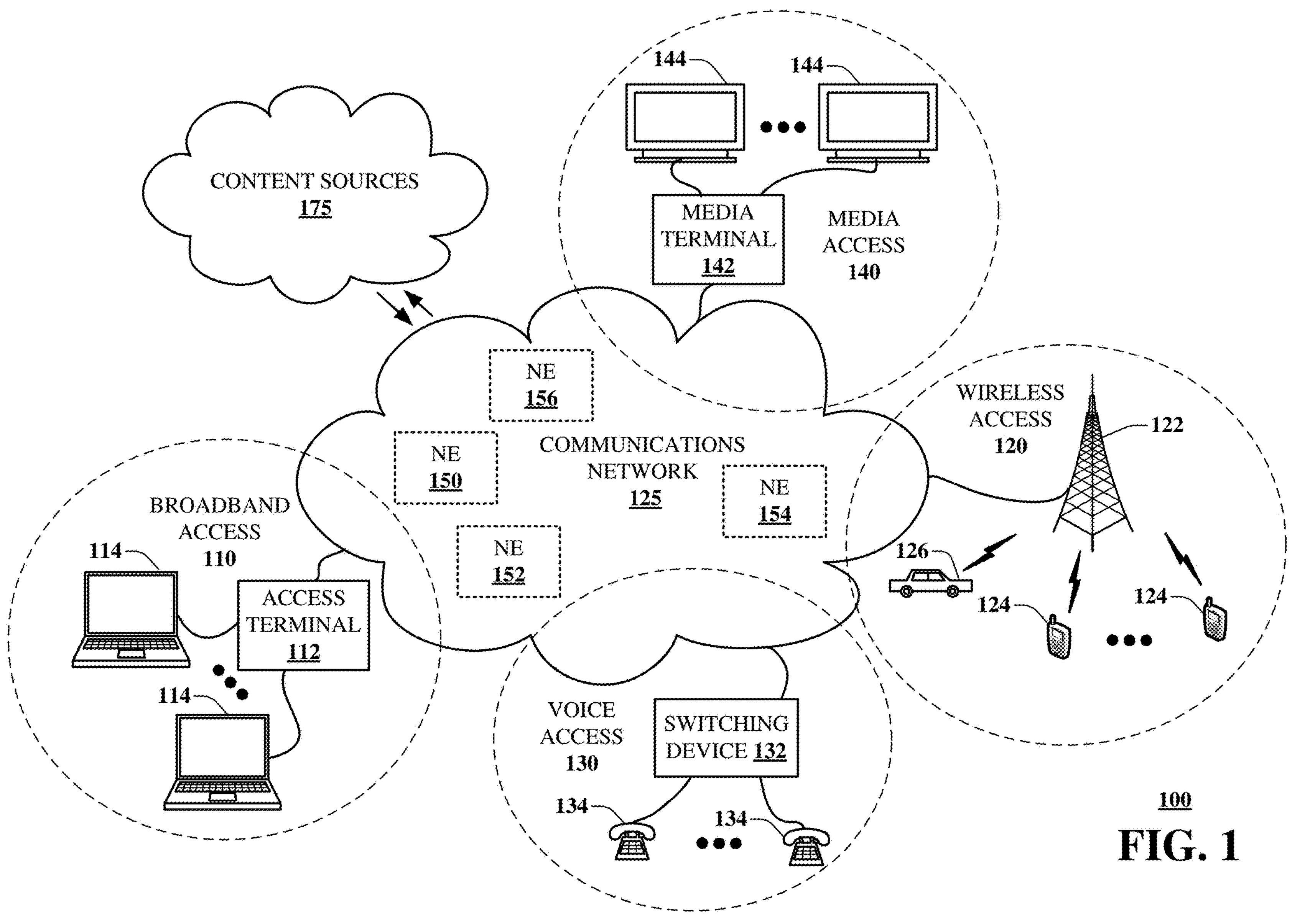
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a system 100 in accordance with various aspects described herein. For example, system 100 can facilitate in whole or in part creating quantum digital twinning models; gathering real-time dynamic data associated with the first high-impact event; generating prompts for a generative AI; and receiving and providing recommendations for actions remediating high-impact events. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a fourth generation (4G), fifth generation (5G), or next generation (NG) wireless access network, WIMAX network, Ultra Wideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

High-impact, wide-area events in society and nature, such as pandemics, structural failures, wildfires, floods, hurricanes, etc., have catastrophic consequences. During these high-impact events, there is a potentially large demand for first responders, who can be overwhelmed by these high-impact, wide-area events. The below-proposed system and methods describe artificial intelligence (AI) agents that provide assistance to first responders, disaster response personnel, and people impacted by a disaster before, during, and after these high-impact events.

Figure 2A:
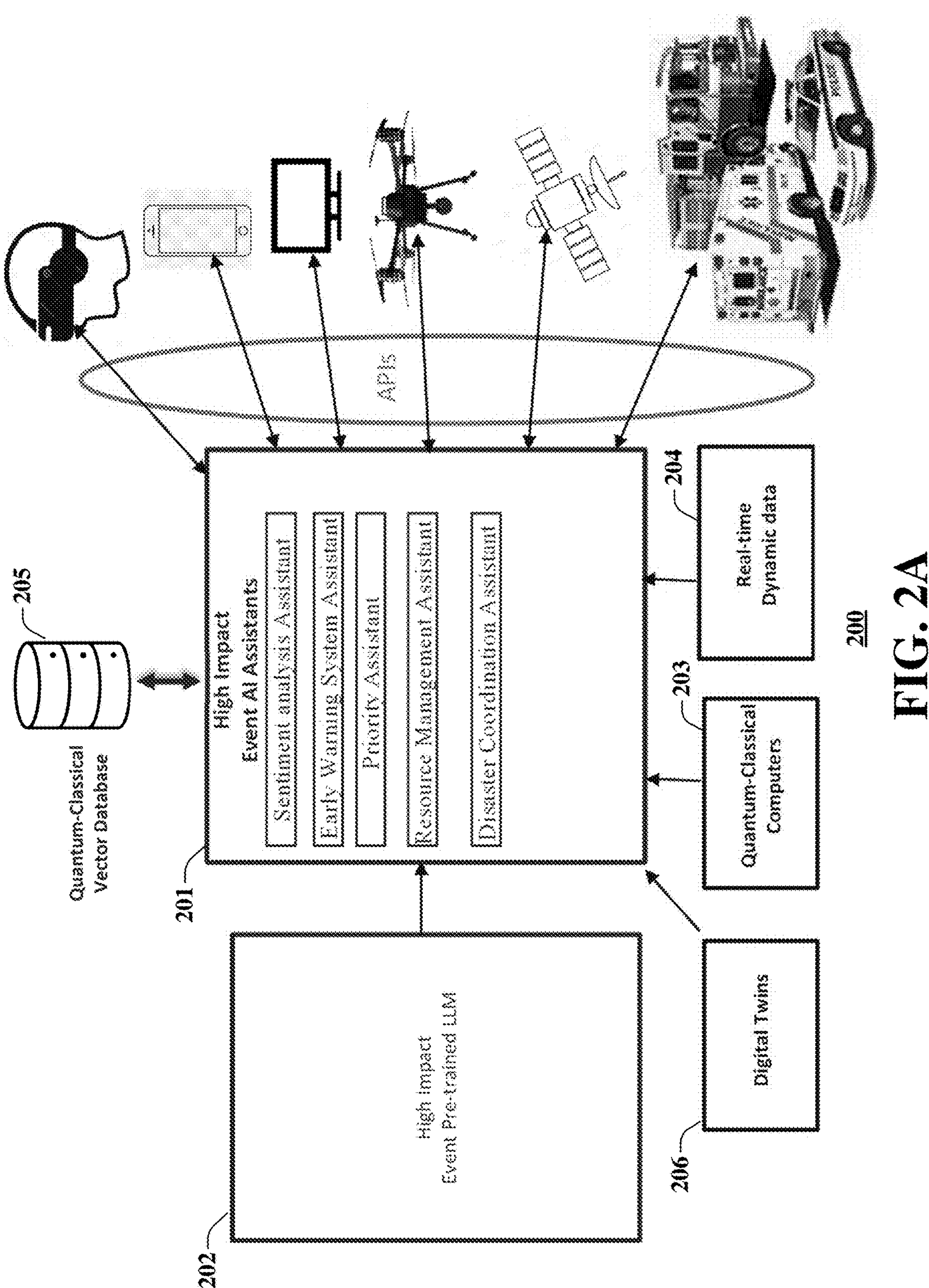
FIG. 2A is a block diagram illustrating an example, non-limiting embodiment of a system for providing assistance to first responders during high-impact events functioning within the communication network of FIG. 1 in accordance with various aspects described herein.

FIG. 2A is a block diagram illustrating an example, non-limiting embodiment of a system for providing assistance to first responders during high-impact events functioning within the communication network of FIG. 1 in accordance with various aspects described herein. As shown in FIG. 2A, system 200 comprises a suite 201 of artificial intelligence (AI) assistants (or agents, which terms hereinafter should be understood to be interchangeable), a generative AI large language model (LLM 202), one or more quantum-classical computers (QCC 203), a data repository (DR 204) holding real-time dynamic data concerning the high-impact events, a quantum vector database 205, and digital twin data models (DT 206), as explained further below.

System 200 trains LLM 202 before deployment. Briefly, system 200 starts the training of LLM 202 by gathering data through DR 204 from various sources like 5G or NG networks, Wi-Fi, utilities (broadband, power, water), the Internet, news outlets, government agencies, social media, historical weather data, and satellite imagery. This data helps monitor and predict the extent of high-impact events. Next, system 200 cleans the collected data by removing irrelevant information, like HTML tags and special characters. Then, the system converts the text into numerical representations using tokenization. To improve the performance of LLM 202, system 200 expands the training dataset by adding noise, masking words, or generating synthetic data. System 200 then converts the preprocessed text into a format suitable for training LLM 202. LLM 202 processes the data in smaller chunks to speed up training. System 200 evaluates performance of LLM 202 using metrics like accuracy, precision, recall, and F1 scores to select the best model.

System 200 fine-tunes the pre-trained LLM 202 on a smaller, task-specific dataset to improve its performance for specific tasks like sentiment analysis or question answering. QCC 203 and quantum machine learning (QML) can also be used to speed up training. In addition, stored, entangled Qubits can serve as reserve hybrid quantum-classical network and compute capacity that is available during wide area disasters and other scenarios. See, e.g., U.S. patent application Ser. No. 17/939,544, filed Sep. 9, 2022, entitled System and Method for Quantum and Classical Network Management, which is incorporated by reference herein.

QML merges the capabilities of quantum computing with machine learning to develop more advanced algorithms and models. Several advantages over classical Machine Learning (ML) arise from the unique properties of quantum computing. QML operates within a 2^n dimensional Hilbert space, which is exponentially larger than the computational resources available to ML. This allows QML algorithms to handle and represent much larger datasets, solving complex problems more efficiently. QCC 203 introduces a level of parallelism not achievable with classical computation. This parallelism enables QCC 203 to perform multiple calculations simultaneously, significantly speeding up processing times for certain tasks. By leveraging quantum algorithms, QML can achieve speedups relative to ML.

In an embodiment, system 200 may use generative adversarial networks (GANs), which are a type of deep learning model used for unsupervised learning, particularly for generating new, synthetic data samples and data sets that are similar to existing datasets. GANs consist of two main components: a generator and a discriminator.

The generator creates new data samples, while the discriminator evaluates these samples and determines whether they are real (from the original dataset) or fake (generated by the generator). The generator and discriminator are trained simultaneously, with the generator trying to create samples that can fool the discriminator, and the discriminator trying to correctly identify real vs fake samples. This adversarial process continues until the generator produces high-quality synthetic samples that are indistinguishable from real ones, and the discriminator is unable to identify them as fake. The trained generator can then be used to generate new samples on demand.

Quantum-Classical Generative Adversarial Networks (QGANs) incorporate quantum mechanics into the generator and discriminator models, allowing for more efficient and expressive representations of data. The approach embodied by system 200 uses quantum states and quantum gates in the generator and discriminator models. Quantum algorithms are also used for optimization and computation. QGANs generate synthetic LLM model training data from Quantum-Classical data collected initially for LLM model training i.e., 5G/NG network data, Wi-Fi network data, utility data (broadband, power, water, etc.) internet data and other sources and iteratively from dynamic system records. QGANs test out parallel scenarios.

Finally, system 200 incorporates human feedback to align the outputs of LLM 202 with user intent through supervised fine-tuning, which adapts the model to a specific domain using a labeled dataset. This process enables LLM 202 to learn task-specific features while still retaining general language knowledge acquired during pre-training.

In a disaster scenario, DR 204 provides a comprehensive knowledge base that would encompass a variety of entities and attributes related to the disaster and its aftermath. This knowledge base would include detailed information on the type of disaster, such as whether it is an earthquake, hurricane, or wildfire. It would also specify the geographical area affected, outlining its boundaries and extent.

DR 204 documents the population of the affected area, including demographic details and information on any vulnerable groups. The infrastructure within this area, such as buildings, roads, bridges, and utilities, would be thoroughly described. Additionally, the knowledge base would identify the emergency response teams involved, detailing their roles and responsibilities, as well as the relief organizations participating in the response, highlighting their areas of expertise and resources.

Attributes within this knowledge base would cover the extent and severity of the damage, including impact of the damage on infrastructure and the environment. The knowledge base would record the number of casualties and injuries resulting from the disaster. Information on evacuation efforts, including the number of people evacuated and the locations of evacuation centers, would be included.

The resources available for disaster response, such as personnel, equipment, and supplies, would be listed. The distribution of aid, including food, water, and medical supplies, would be tracked. Finally, DR 204 would outline plans for recovery and reconstruction, detailing efforts to rebuild infrastructure and restore services.

In an embodiment, DR 204 would be focused on disaster effects on 5G/NG networks. DR 204 would encompass a variety of entities and attributes related to the network infrastructure, network performance, and the impact on disaster response efforts. This knowledge base would detail the network infrastructure, including the locations of core elements, cell towers, base stations, and other network equipment. It would also outline the coverage area of the network, specifying its range and signal strength.

In an embodiment, DR 204 would identify the emergency response teams involved in the disaster response, detailing their roles and responsibilities. The knowledge base would also document the population of the affected area, including demographic details and information on any vulnerable groups.

Attributes within DR 204 would cover the network performance before, during, and after the disaster, including uplink (UL) and downlink (DL) speeds, latency, and reliability. Other attributes would record the availability of the network, noting any outages or disruptions, and the network capacity, including the number of simultaneous connections and data usage.

The resilience of the network would be assessed, considering factors such as power outages, equipment damage, and environmental impacts. The coordination of disaster response efforts utilizing the network would be detailed, including communication among emergency response teams and relief organizations. Additionally, the knowledge base would evaluate the ability of the network to provide communication channels for the affected population, ensuring access to emergency services and communication with family and friends.

Chaos testing is a method of testing software systems and applications to determine their resilience and robustness in the face of unexpected events, failures, and anomalies. The goal of chaos testing is to identify and address potential weaknesses and vulnerabilities in a system before introduction into live networks. Optimization of chaos test scenarios can be challenging due to the high dimensionality of the problem. QCC 203 solves these optimization problems faster and more accurately. QCC 203 has the potential to provide more accurate results than classical computers due to the use of quantum algorithms and quantum parallelism. This leads to more accurate and reliable results in chaos testing.

In this embodiment, chaos testing would be used to evaluate the performance of the network in scenarios that simulate real-world conditions, such as network congestion, hardware failures, software failures and other untoward events. The aim would be to determine how well the network can handle these types of challenges and recover from them in a graceful manner, without impacting quality of service. Chaos testing would assess the network's ability to handle a wide range of adverse conditions and to identify areas for improvement. This information would also be used to make adjustments and improvements to the network design and implementation to ensure reliable and robust service in real-world scenarios.

By including these entities and attributes, disaster response teams and relief organizations can efficiently query the knowledge base to obtain up-to-date information on the performance of the affected 5G/NG networks and their impact on disaster response efforts. This information can be used to make informed decisions about deploying resources, coordinating emergency response efforts, and providing communication channels for the affected population.

Generally, LLMs utilize "word embedding" to capture and store featured information as vectors. Word embedding is a method of representing words as numerical vectors in a high-dimensional space, where each dimension corresponds to a particular feature. Vectors learned by large language models are stored in vector databases that are optimized for efficient vector operations, such as similarity searches and nearest neighbor searches.

Vectors stored in vector databases are typically assigned unique identifiers where the vector database stores a mapping between the identifiers and corresponding vectors. During query time, the database retrieves the vectors corresponding to the input query and computes their similarity to the vectors in the database, returning the nearest neighbors or search results based on the specified similarity metric.

In an embodiment, the vectors learned by LLM 202 are stored in quantum vector database 205, which is optimized for efficient vector operations. Vector databases constitute a high impact, wide area events knowledge base with rapid search capabilities. An exemplary vector database schema is set forth in more detail below in connection with FIG. 2B.

Disaster response teams and relief organizations can efficiently query the knowledge base through AI assistants in suite 201 to retrieve up-to-date information on the disaster and its impact and utilize the information to make timely, informed decisions directed to their response efforts.

Suite 201 comprises exemplary AI assistants that can be deployed to extract focused information from LLM 202 to handle specific tasks during high-impact events.

These AI assistants use well-engineered prompts to ensure high-quality information is retrieved from the LLM 202 in preferred formats.

A sentiment analysis assistant detects sentiment analysis specific to physical exhaustion or emotional trauma. As first responders may experience physical exhaustion due to long hours, dangerous working conditions, and the physically demanding nature of their work, and emotional trauma from exposure to traumatic events, such exposure can affect their ability to perform their duties effectively. The sentiment analysis assistant can detect physical and/or emotional trauma through voice analysis (audio speech/background noise) and multimedia (text, video, etc.) sentiment analysis.

Video/audio object detection and scene analysis are also applied where available to detect physical and/or emotional trauma.

An early warning assistant uses real-time information and analysis from LLM 202 to trigger detailed alerts to a warning system that can notify people in affected areas of anticipated dangers. Early warnings incorporate detailed geographic information and up-to-date routing. Quantum computing and QML provide direct and alternate evacuation routes that are calculated on-the-fly. Mission-critical communication traffic, such as police, fire, EMTs, FEMA, etc., is routed based on need, context, and other factors.

A priority assistant prioritizes large volumes of calls for assistance and delegates assistance based on first responder hierarchy, geographic location, type of assistance requested (police, fire, EMT, etc.), injury severity, damage area, and other factors. The context of calls for assistance is also a crucial factor in collecting, prioritizing, and grouping calls and other data.

A resource management assistant distributes resources such as food, shelter, and medical supplies to affected areas based on the needs reported through the AI assistance platforms. Aerial drones are one method of distribution. QCC 203 and QML provide aerial drone routing. Routing decision parameters include geographic location, type of assistance requested (police, fire, EMS, FEMA, etc.), damage area, context, and other factors. QML algorithms optimize resource allocation and management in networks, such as optimizing the use of bandwidth, energy, and other resources.

A disaster coordination assistant orchestrates a wide range of critical resources across disaster-affected areas. The disaster coordination assistant establishes secure communication channels across different agencies and organizations. The disaster coordination assistant analyzes data and prioritizes the restoration of critical infrastructure (roads, bridges, power, communications). The disaster coordination assistant coordinates the deployment of repair crews and equipment to critical sites. The disaster coordination assistant assists in designing evacuation routes and schedules based on real-time traffic and hazard data.

DT 206 provides analytics and digital twins to continually evaluate the effectiveness of the system and gather feedback from users to improve the response to future events. A digital twin is a digital representation of a real-world object or system. DT 206 represents one or more models of public safety emergency scenarios-both natural and manmade. See, e.g., U.S. patent application Ser. No. 17/963,657, filed Oct. 11, 2022, entitled System and Methods for Quantum Digital Twinning and Public Safety Management, which is incorporated by reference herein.

In an embodiment, system 200 implements quantum-resistant security measures to protect sensitive information and prevent cyber-attacks during high impact events. See, e.g., U.S. patent application Ser. No. 18/181,324, filed Mar. 9, 2023, entitled Post-Quantum-Resistant Cryptographic System and Methods, which is incorporated by reference herein.

Figure 2B:
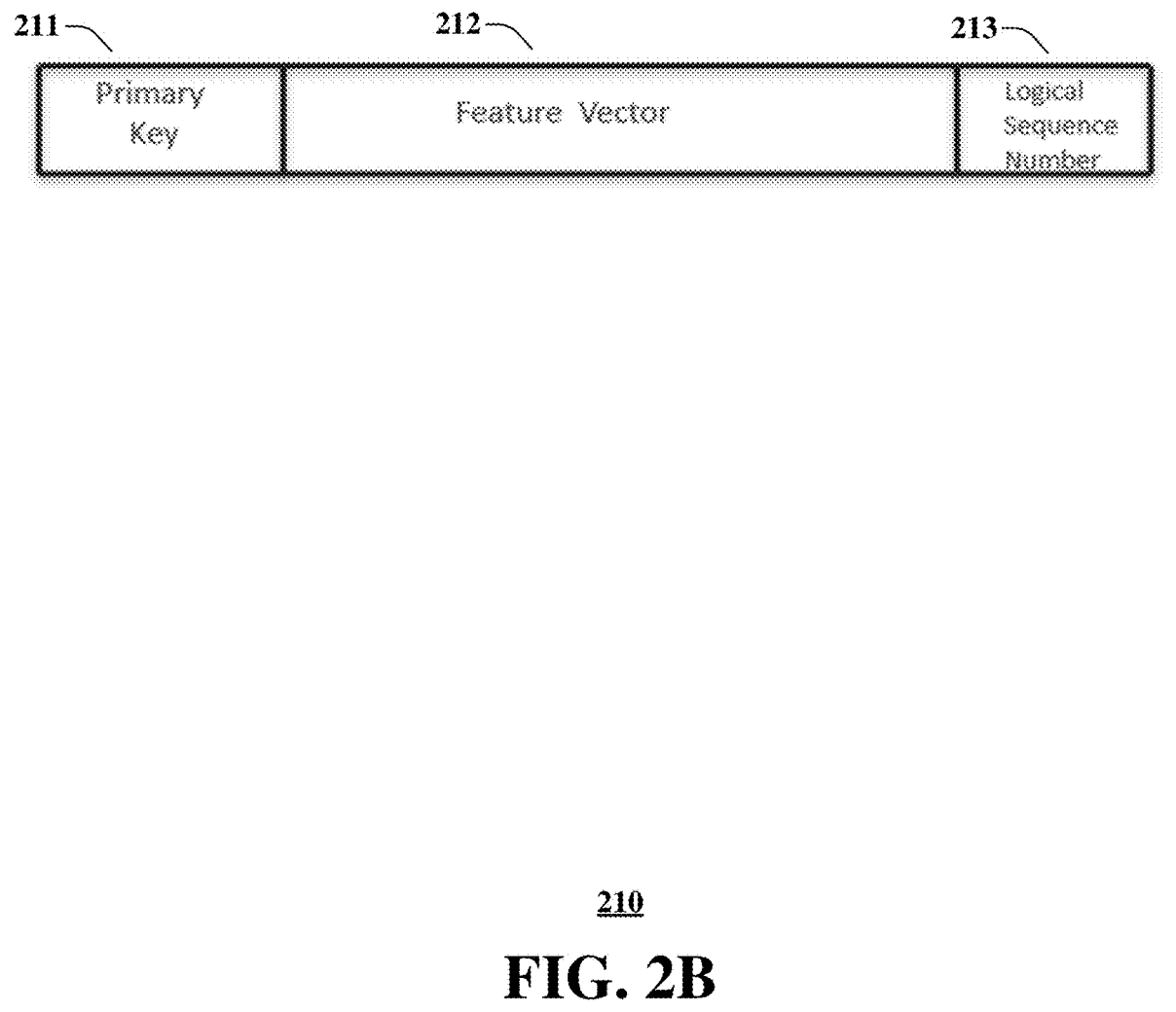

FIG. 2B is a block diagram illustrating an example, non-limiting embodiment of a quantum vector database schema (which in some embodiments may be referred to as a quantum-classical vector database schema) for disaster recovery used in a system for providing assistance to first responders during high-impact events functioning within the communication network of FIG. 1 in accordance with various aspects described herein. In FIG. 2B, an exemplary schema 210 for a disaster recovery vector database is illustrated. Schema 210 comprises a primary key 211, a feature vector 212 and a logical sequence number 213 that is optimized for efficient vector operations using quantum computing.

A Quantum-Classical Vector Database (Q-CVDB) is a sophisticated data management system that merges quantum and classical computing techniques to optimize the retrieval of high-dimensional data. Utilizing quantum algorithms like Grover's search algorithm, the Q-CVDB accelerates data retrieval operations, making it ideal for applications requiring rapid similarity searches and nearest neighbor queries. This hybrid system leverages the strengths of classical vector databases while incorporating quantum computing capabilities to enhance efficiency and scalability.

The architecture of the Q-CVDB can include a Classical Database Management System (DBMS) for data preprocessing, vectorization, storage, indexing, and query processing, and middleware for managing communication with a Quantum Processing Unit (QPU). The QPU, comprising quantum memory, quantum gates, and circuits for Grover's algorithm, performs search operations with significant speedup. A Quantum-Classical Interface handles the execution of quantum circuits and the encoding/decoding of data between classical and quantum states. The system executes hybrid queries, decomposing and allocating tasks between quantum and classical processors, ensuring efficient data flow and robust operations through synchronization and error handling.

By leveraging quantum principles, the Q-CVDB addresses the scalability and efficiency limitations of traditional vector databases, providing substantial improvements in data handling. Current and future improvements in Q-CVDBs makes them powerful tools for high-dimensional data retrieval.

In schema 210, primary key 211 is a unique identifier assigned to records to facilitate efficient indexing, searching, and retrieval of data. Since primary key 211 should be unique for each record, a combination of attributes can be used to ensure that every record can be distinctly identified. Primary key 211 plays a crucial role in uniquely identifying various elements. For instance, each disaster event is assigned a unique identifier, known as an Event ID, which could be an alphanumeric code, a sequential number, or a universally unique identifier (UUID). The location of the disaster is pinpointed using a combination of geographical coordinates (latitude, longitude, altitude) or administrative codes, such as FIPS codes in the United States. Additionally, the timestamp, which records the date and time of the disaster event or response action, is noted with precise granularity, ranging from microseconds to years.

Feature vector 212 encompasses attributes related to the disaster event. These attributes include the type of disaster, such as an earthquake, hurricane, flood, wildfire, or tornado, and the magnitude, which measures the severity or intensity of the disaster using scales like the Richter scale for earthquakes or the Saffir-Simpson scale for hurricanes.

The affected area is described in terms of its size, population density, or land use classification. Information about infrastructure damage, including damaged or destroyed buildings, roads, and bridges, is also included. The number of casualties, detailing those injured, killed, or displaced, is recorded. Response resources are tracked, noting the availability and allocation of first responders, medical facilities, food, water, and temporary shelters. Recovery progress is measured through indicators such as the percentage of restored utilities, reconstructed buildings, or repopulated areas. Socio-economic factors, such as income levels, access to services, and education levels, which can influence the vulnerability and resilience of communities, are also considered. These feature vector attributes are not exhaustive, as feature vectors can have thousands to tens of thousands of dimensions. These vectors are generated by applying a transformation or embedding function to raw data, which can include text, images, audio, and video. The embedding function can be based on various methods, including QML models, word embeddings, and feature extraction algorithms.

The main advantage of a vector database is rapid and accurate similarity search and retrieval of data based on their vector distance or similarity. A vector database can be searched to find the most similar or relevant data based on semantic or contextual meaning. To perform similarity search and retrieval in a vector database, a query vector is used that represents the desired information or criteria. The query vector can be either derived from the same type of data as the stored vectors (e.g., using an image as a query for an image database), or from diverse types of data (e.g., using text as a query for an image database).

A similarity measure is then used to calculate how close or distant two vectors are in the vector space. The similarity measure can be based on cosine similarity, Euclidean distance, hamming distance, and/or Jaccard index. The result of the similarity search and retrieval is a ranked list of vectors that have the highest similarity scores with the query vector. Corresponding raw data associated with each vector from the original source or index can then be accessed.

QML enhances Quantum-classical vector database search and retrieval in several ways, leveraging the unique properties of quantum computing to improve performance, efficiency, and scalability. QML accelerates search and retrieval processes. Quantum computing enables more efficient calculations of similarity and distance metrics between vectors, which are crucial for tasks like clustering, classification, and recommendation systems. These quantum-based calculations lead to faster processing times and improved accuracy in vector database operations. The exponential computational resources provided by quantum computing address scalability challenges faced by vector databases, especially when dealing with high-dimensional data. QML handles larger datasets and higher-dimensional vectors more efficiently than classical machine learning algorithms, making it well-suited for big data applications. Quantum computing offers more efficient data compression and dimensionality reduction techniques for managing large vector databases. By leveraging quantum algorithms, QML discovers more compact representations of high-dimensional data, leading to reduced storage requirements and faster processing times.

QML enhances vector database operations by utilizing quantum-inspired optimization techniques, such as the Quantum Approximate Optimization Algorithm (QAOA) and quantum annealing. These techniques help find better solutions to optimization problems, such as clustering and nearest-neighbor search, which are common in vector database applications.

Logical sequence number 213 is a system field hidden from users. Quantum quantization, which is well known to those skilled in the art, is used to convert classical vectors to qubit vectors will be done by. By converting classical vectors to qubit vectors, quantum entanglement can be created between the qubit vectors.

Arbitrary sized quantum entangled qubit vector databases searches could then be interrogated utilizing quantum search algorithms such as Grover's or Routt's quantum search. Whereas classical search techniques generally require an average of N/2 (0.5N) items to be tested before finding the correct one, Grover's quantum search algorithm performs the same task with a complexity order of O(VN) steps, giving rise to quadratic speed up relative to classical search where initialization to superposition is obtained within O(log N) steps, and where objects of interest are marked items in unstructured databases. In Routt's quantum search, a quantum oracle 'marks' quantum search results to queries by phase-shifting search queries via quantum gap logic that approaches infinite root (→∞√N/M) search iterations at hyper-exponentially convergent calculation velocities, where the quantum search problem contains N possible items with M possible solutions, and where massively scalable local and non-local quantum/classical searches are performed across structured and unstructured databases.

Figure 2C:
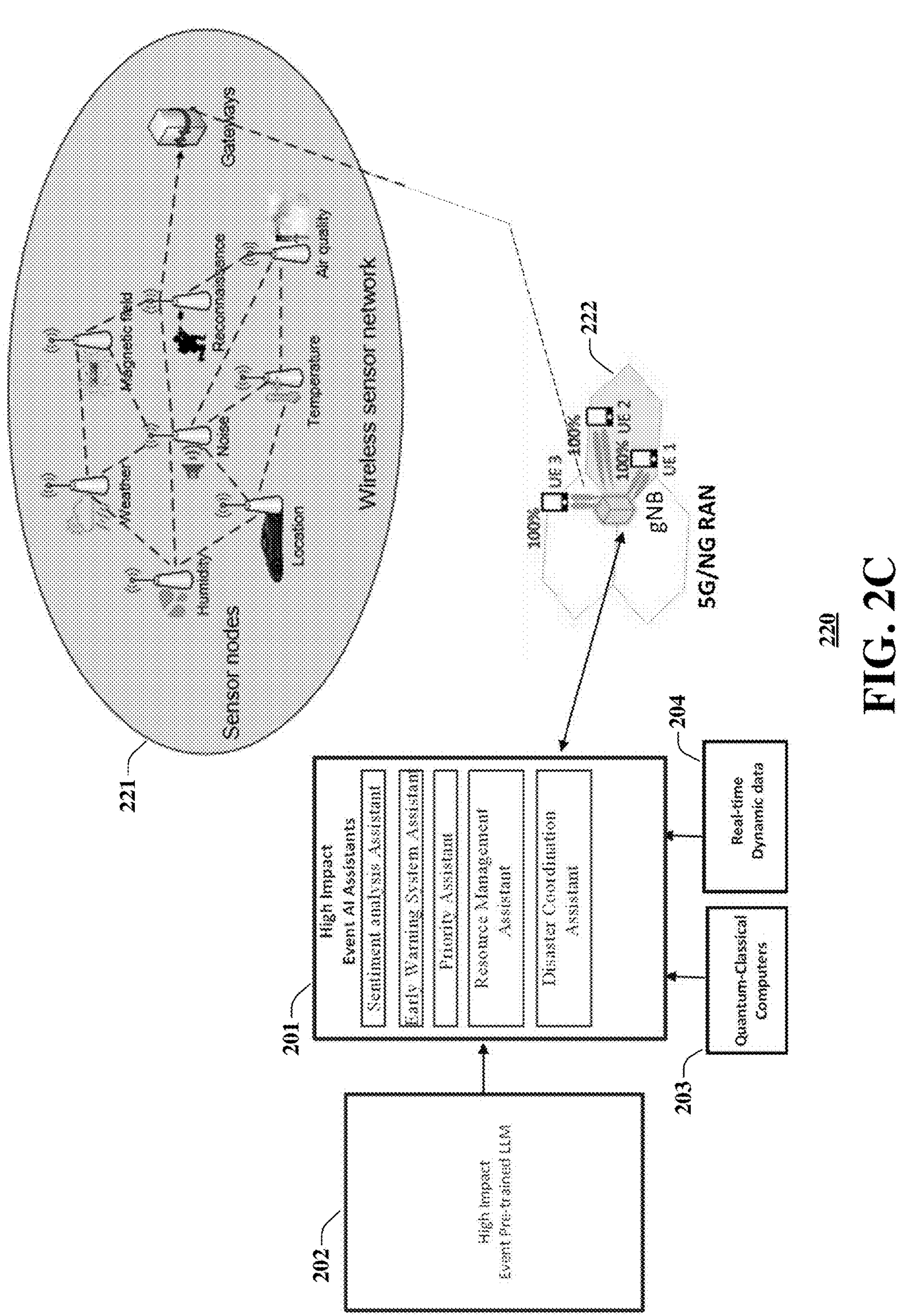
FIG. 2C is a block diagram illustrating an example, non-limiting embodiment of a system for providing assistance to first responders during high-impact events with a wireless sensor network functioning within the communication network of FIG. 1 in accordance with various aspects described herein.

FIG. 2C is a block diagram illustrating an example, non-limiting embodiment of a system for providing assistance to first responders during high-impact events with a wireless sensor network functioning within the communication network of FIG. 1 in accordance with various aspects described herein. As shown in FIG. 2C, system 220 comprises a suite 201 of High Impact Event AI assistants, and a wireless sensor network 221 comprising Internet of Things (IOT) and wireless sensors that provide data (weather, magnetic, noise, location, air quality), and First Responder biometrics (heart rate, breath, EKG, etc.) data for collection by system 220 through a 5G/NG RAN 222. The suite 201 of assistants would also analyze this data and generate context and insights that can inform, make predictions and improve disaster recovery efforts.

Figure 2D:
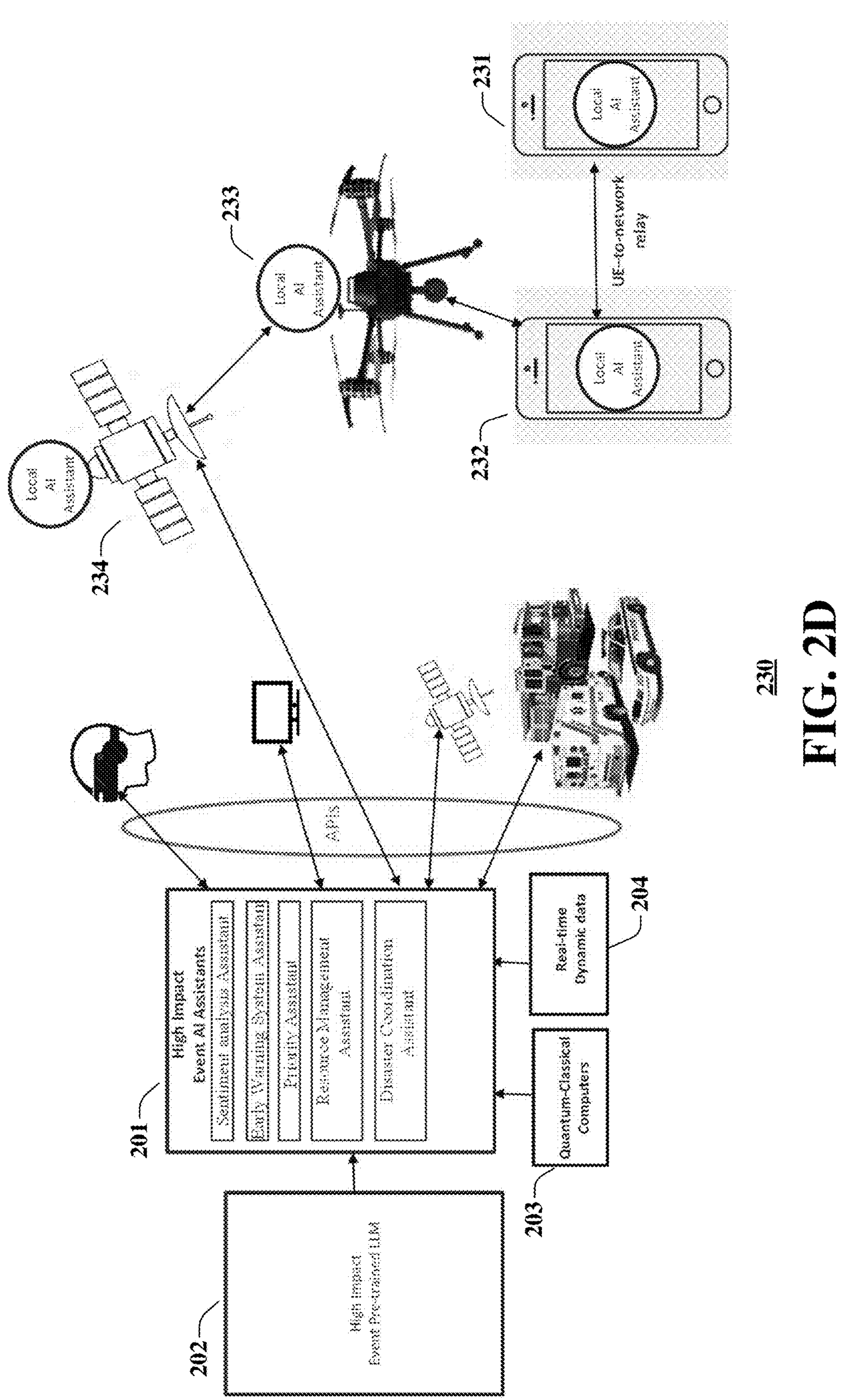
FIG. 2D is a block diagram illustrating an example, non-limiting embodiment of a system for providing assistance to first responders during high-impact events with local AI assistants functioning within the communication network of FIG. 1 in accordance with various aspects described herein.

FIG. 2D is a block diagram illustrating an example, non-limiting embodiment of a system for providing assistance to first responders during high-impact events with local AI assistants functioning within the communication network of FIG. 1 in accordance with various aspects described herein. As shown in FIG. 2C, system 230 comprises a local AI assistants 231 that is not directly connected to the communications network where the majority of the system resides, but rather connects through alternative means, such as 3GPP proximity services (ProSe) via peer-to-peer relays via other devices, such as another local AI assistant 232, drone 233, satellite 234 or the like. ProSe is a feature that enables communication between devices in close proximity without network connectivity. ProSe supports direct device-to-device communication. In a High Impact Event, where network coverage may be sparse or unavailable, ProSe can help First Responders and other customers stay connected and relay information for local AI assistants 231, 232.

Figure 2E:
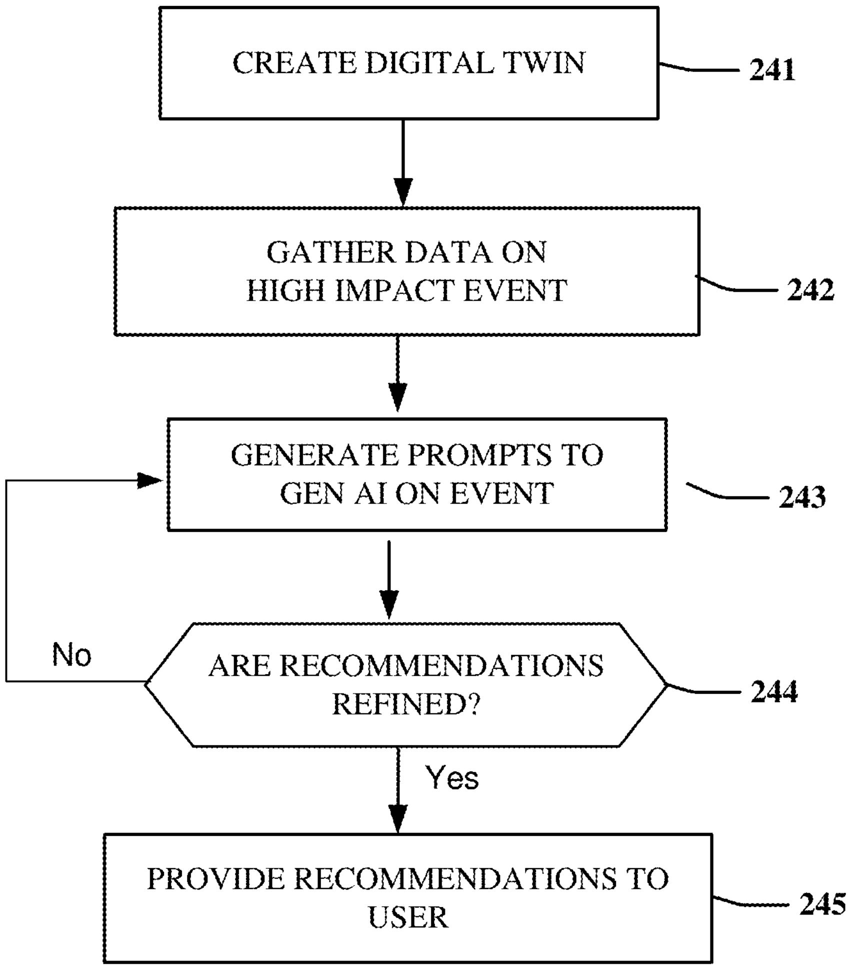
FIG. 2E depicts an illustrative embodiment of a method in accordance with various aspects described herein.

FIG. 2E depicts an illustrative embodiment of a method in accordance with various aspects described herein. As shown in FIG. 2E, method 240 begins at step 241 where the system creates a digital twin to model the real-world scenario of a high-impact event. Next in step 242, the system gathers real-time data concerning the high-impact event. Then in step 243, the system generates prompts for a pre-trained, generative AI based on actions that should be taken given the current state of the high-impact event. In an embodiment, the prompts might be triggered by user input asking for advice handling problems perceived by first responders.

The generated prompts are provided to the generative AI, which responds with recommendations in step 244. Sometimes, recommendations provided by a generative AI require further prompts to arrive at the best advice, so in step 244, the system checks whether the recommendations are good. If further prompting may be necessary, then the process repeats at step 243 to further refine the responses provided by the generative AI. Once refined in step 245, the recommendations are provided to the user of the system.

While for purposes of simplicity of explanation, the respective processes are shown and described as a series of blocks in FIG. 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
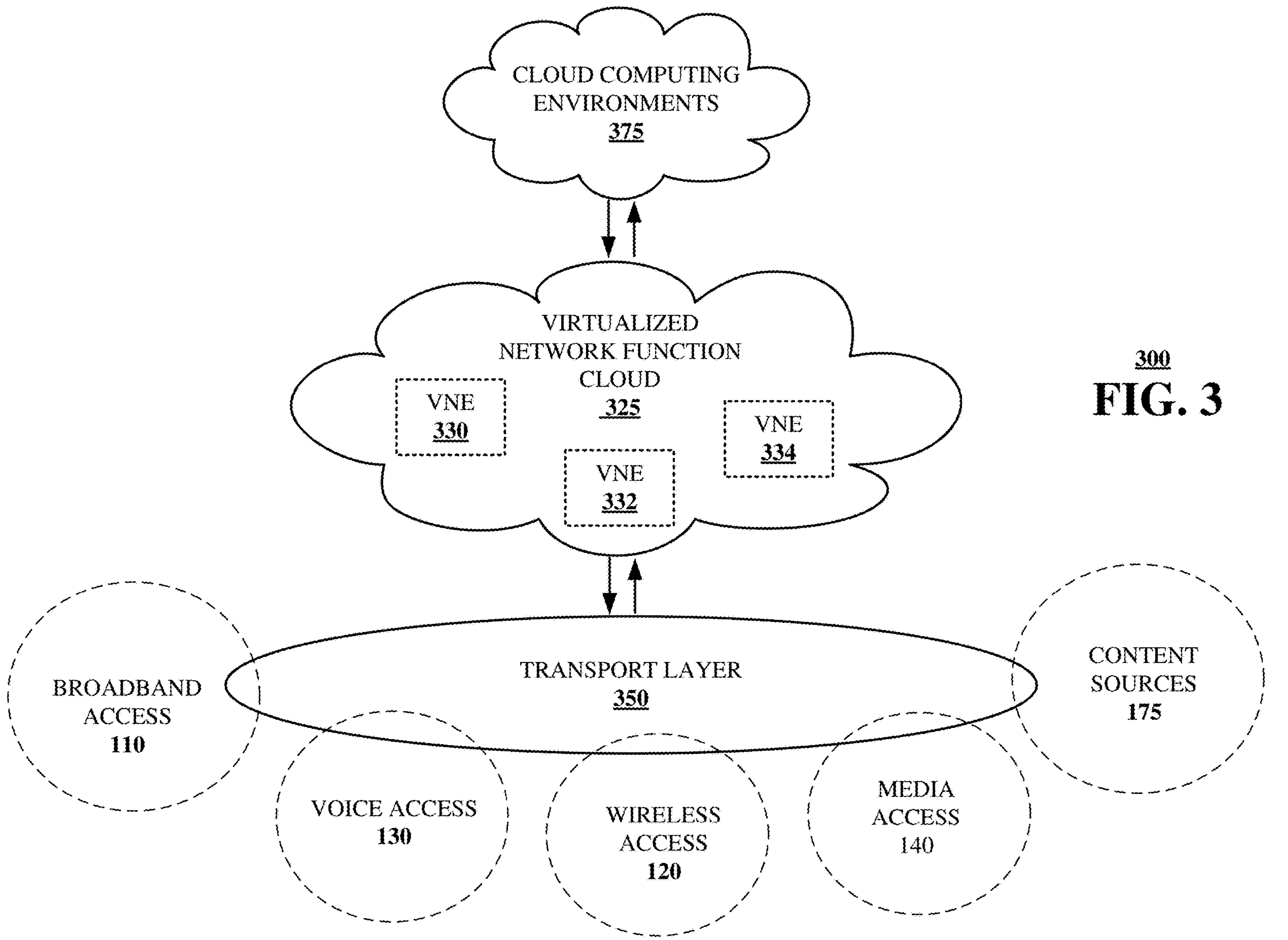
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of systems 200, 220 and method 240 presented in FIGS. 1, 2A, 2B, 2C, 2D, 2E and 3. For example, virtualized communication network 300 can facilitate in whole or in part creating quantum digital twinning models; gathering real-time dynamic data associated with the first high-impact event; generating prompts for a generative AI; and receiving and providing recommendations for actions remediating high-impact events.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward substantial amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
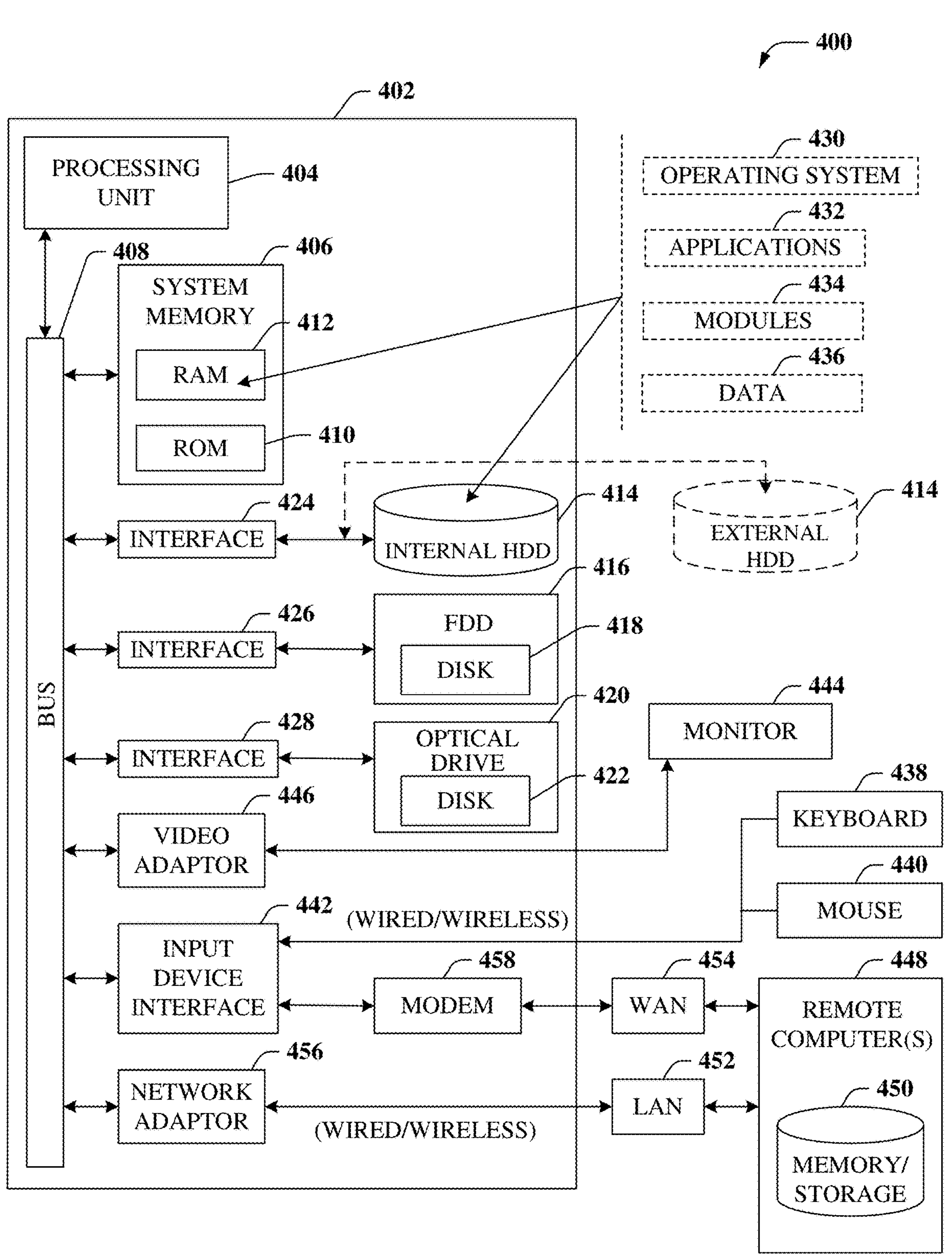
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a computing environment 400 suitable to implement the various embodiments of the subject disclosure. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part creating quantum digital twinning models; gathering real-time dynamic data associated with the first high-impact event; generating prompts for a generative AI; and receiving and providing recommendations for actions remediating high-impact events.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can also be practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures.

The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can also be connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are examples and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
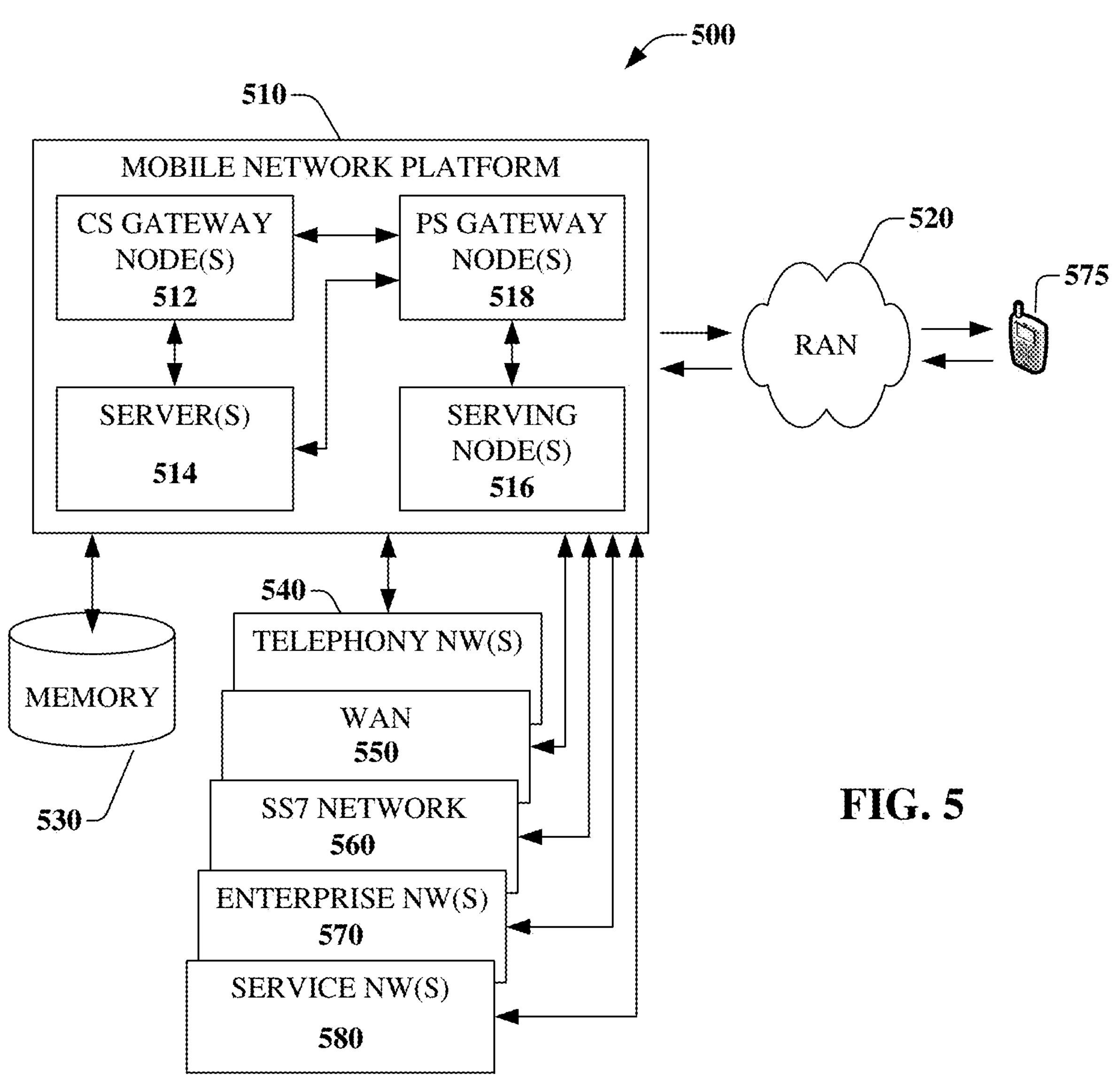
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part creating quantum digital twinning models; gathering real-time dynamic data associated with the first high-impact event; generating prompts for a generative AI; and receiving and providing recommendations for actions remediating high-impact events. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules.

Generally, program modules comprise routines, programs, components, data structures, etc. that perform particular tasks and/or implement particular abstract data types.

Figure 6:
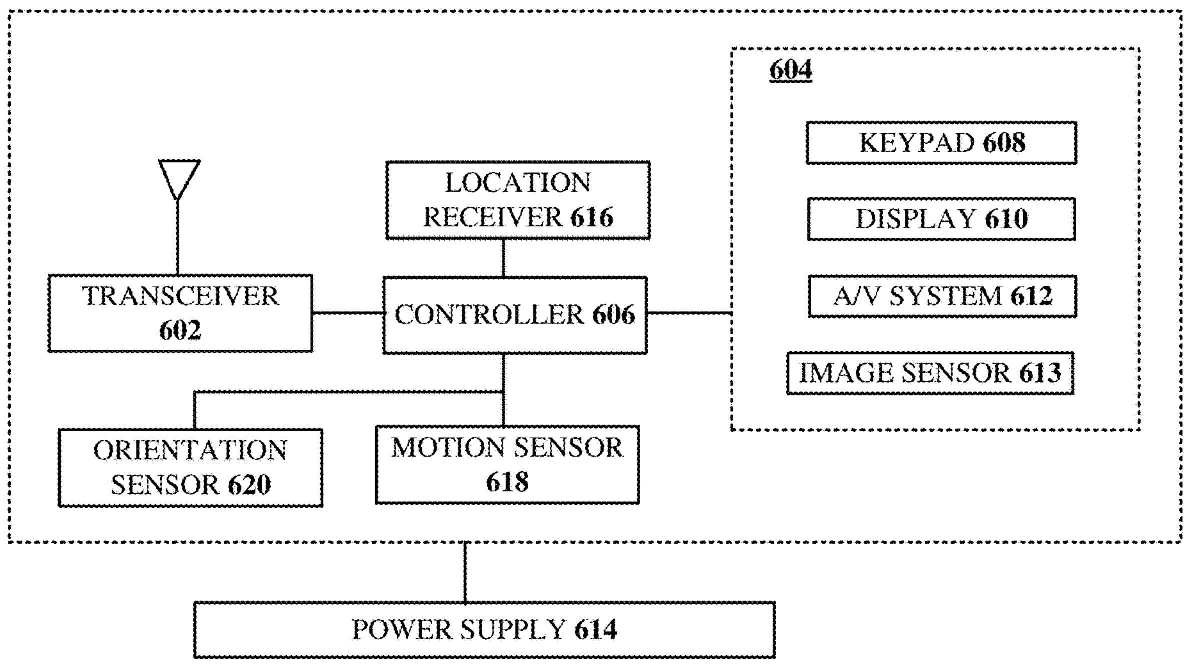
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, communication device 600 can facilitate in whole or in part creating quantum digital twinning models; gathering real-time dynamic data associated with the first high-impact event; generating prompts for a generative AI; and receiving and providing recommendations for actions remediating high-impact events.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals from an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof.

Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, f(x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a “start” and/or “continue” indication. The “start” and “continue” indications reflect that the steps presented can optionally be incorporated in or otherwise used in conjunction with other routines. In this context, “start” indicates the beginning of the first step presented and may be preceded by other activities not specifically shown. Further, the “continue” indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) “operably coupled to,” “coupled to,” and/or “coupling” includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:

a processing system including a processor; and a memory that stores executable instructions that, when executed by the processing system, facilitate performance of operations by a suite of artificial intelligence (AI) assistants, the operations comprising:

creating a quantum digital twinning model for a first high-impact event, wherein the first high-impact event comprises a wide-area event adversely affecting a network infrastructure of a telecommunications network;

gathering real-time dynamic data associated with the first high-impact event;

generating high-dimensional feature vectors representing attributes of the first high-impact event, the attributes comprising at least one of disaster type, geographic impact, infrastructure damage, network performance metrics, and resource availability;

storing the high-dimensional feature vectors in a quantum-classical vector database (Q-CVDB), the Q-CVDB comprising a classical database management system configured for vector preprocessing, indexing, and storage, the Q-CVDB further comprising a quantum processing unit (QPU) configured to execute a quantum search algorithm over qubit-encoded vectors;

performing a similarity search, using the quantum search algorithm executed by the QPU, over qubit-encoded vectors derived from the high-dimensional feature vectors;

generating prompts for a generative AI trained for high-impact events based on results of the similarity search, the quantum digital twinning model, and the real-time dynamic data; and receiving and providing recommendations for actions addressing issues related to the first high-impact event to a user of the device.

2. The device of claim 1, wherein the suite of AI assistants comprises a sentiment analysis assistant, and wherein the operations further comprise detecting physical and/or emotional trauma of the user.

3. The device of claim 1, wherein the suite of AI assistants comprises an early warning system assistant, and wherein the operations further comprise notifying the user and other people in an affected area of anticipated dangers associated with the first high-impact event.

4. The device of claim 1, wherein the suite of AI assistants comprises a priority assistant, and wherein the operations further comprise delegating assistance based on factors comprising a position of the user in a first responder hierarchy, geographic location, type of assistance requested, injury severity, damage area, or a combination thereof.

5. The device of claim 1, wherein the suite of AI assistants comprises a resource management assistant, and wherein the operations further comprise managing and distributing resources to areas affected by the first high-impact event.

6. The device of claim 1, wherein the suite of AI assistants comprises a disaster coordination assistant, and wherein the operations further comprise establishing secure communications channels across different agencies and organizations; and prioritizing restoration of critical infrastructure affected by the first high-impact event.

7. The device of claim 1, wherein the operations further comprise training the generative AI to provide assistance to first responders, disaster response personnel, and people impacted by the first high-impact event.

8. The device of claim 1, wherein the Q-CVDB further comprises a quantum-classical interface.

9. The device of claim 1, wherein the processing system comprises a plurality of processors operating in a distributed computing environment.

10. A non-transitory machine-readable medium, comprising executable instructions that, when executed by a processing system including a processor, facilitate performance of operations, the operations comprising:

implementing a suite of artificial intelligence (AI) assistants;

gathering real-time dynamic data associated with a first high-impact event, wherein the first high-impact event comprises a wide-area event adversely affecting a network infrastructure of a telecommunications network;

generating high-dimensional feature vectors representing attributes of the first high-impact event, the attributes comprising at least one of disaster type, geographic impact, infrastructure damage, network performance metrics, and resource availability;

storing the high-dimensional feature vectors in a quantum-classical vector database (Q-CVDB), the Q-CVDB comprising a classical database management system configured for vector preprocessing, indexing, and storage, the Q-CVDB further comprising a quantum processing unit (QPU) configured to execute a quantum search algorithm over qubit-encoded vectors;

performing a similarity search, using the quantum search algorithm executed by the QPU, over qubit-encoded vectors derived from the high-dimensional feature vectors;

the suite of AI assistants generating prompts for a generative AI trained for high-impact events based on results of the similarity search and the real-time dynamic data;

receiving a recommendation of actions addressing issues related to the first high-impact event from the generative AI;

repeating the generating and receiving steps until the recommendation received from the generative AI is refined; and the suite of AI assistants providing the recommendation to a user.

11. The non-transitory machine-readable medium of claim 10, wherein the suite of AI assistants comprises a sentiment analysis assistant, and wherein the operations further comprise detecting physical and/or emotional trauma of the user.

12. The non-transitory machine-readable medium of claim 10, wherein the suite of AI assistants comprises an early warning system assistant, and wherein the operations further comprise notifying the user and other people in an affected area of anticipated dangers associated with the first high-impact event.

13. The non-transitory machine-readable medium of claim 10, wherein the suite of AI assistants comprises a priority assistant, and wherein the operations further comprise delegating assistance based on factors comprising a position of the user in a first responder hierarchy, geographic location, type of assistance requested, injury severity, damage area, or a combination thereof.

14. The non-transitory machine-readable medium of claim 10, wherein the suite of AI assistants comprises a resource management assistant, and wherein the operations further comprise managing and distributing resources to areas affected by the first high-impact event.

15. The non-transitory machine-readable medium of claim 10, wherein the suite of AI assistants comprises a disaster coordination assistant, and wherein the operations further comprise establishing secure communications channels across different agencies and organizations; and prioritizing restoration of critical infrastructure affected by the first high-impact event.

16. The non-transitory machine-readable medium of claim 10, wherein the Q-CVDB further comprises a quantum-classical interface.

17. The non-transitory machine-readable medium of claim 10, wherein the operations further comprise storing vectors for processing by the generative AI in a quantum vector database.

18. The non-transitory machine-readable medium of claim 10, wherein the processing system comprises a plurality of processors operating in a distributed computing environment.

19. A method, comprising:

effectuating, by a processing system including a processor, a suite of artificial intelligence (AI) assistants;

collecting, by the processing system, real-time dynamic data associated with a first high-impact event, wherein the first high-impact event comprises a wide-area event adversely affecting a network infrastructure of a telecommunications network;

generating, by the processing system, high-dimensional feature vectors representing attributes of the first high-impact event, the attributes comprising at least one of disaster type, geographic impact, infrastructure damage, network performance metrics, and resource availability;

storing, by the processing system, the high-dimensional feature vectors in a quantum-classical vector database (Q-CVDB), the Q-CVDB comprising a classical database management system configured for vector preprocessing, indexing, and storage, the Q-CVDB further comprising a quantum processing unit (QPU) configured to execute a quantum search algorithm over qubit-encoded vectors;

performing, by the processing system, a similarity search, using the quantum search algorithm executed by the QPU, over qubit-encoded vectors derived from the high-dimensional feature vectors;

generating, by the suite of AI assistants, prompts provided to a generative AI trained for high-impact events, wherein the prompts are based on results of the similarity search and the real-time dynamic data;

receiving, by the suite of AI assistants, a recommendation of actions addressing issues related to the first high-impact event from the generative AI;

repeating, by the suite of AI assistants, the generating prompts and receiving the recommendation steps until the recommendation received from the generative AI is refined; and providing, by the suite of AI assistants, the recommendation to a user of the suite of AI assistants.

20. The method of claim 19, comprising: creating, by the processing system, a quantum digital twinning model for the first high-impact event, wherein the generating of the prompts is further based on the quantum digital twinning model.

* * * * *